(12) United States Patent
Shin et al.

(10) Patent No.: US 6,736,876 B1
(45) Date of Patent: May 18, 2004

(54) FLUIDIZED BED BREAKAGE PREVENTION SYSTEM FOR FLUIDIZED BED REDUCTION REACTOR AND METHOD

(75) Inventors: Myoung-Kyun Shin, Pohang (KR);
Jun-Hyuk Lee, Pohang (KR);
Sun-Kwang Jeong, Pohang (KR);
Nag-Joon Choi, Pohang (KR);
Hang-Goo Kim, Pohang (KR);
Heung-Won Kang, Pohang (KR)

(73) Assignee: Research Institute of Industrial Science & Technology, Kyungsangbuk-do (KR)

( * ) Notice: Subject to any disclaimer, the term of this patent is extended or adjusted under 35 U.S.C. 154(b) by 168 days.

(21) Appl. No.: 09/869,725
(22) PCT Filed: Nov. 3, 2000
(86) PCT No.: PCT/KR00/01257
§ 371 (c)(1),
(2), (4) Date: Nov. 13, 2001
(87) PCT Pub. No.: WO01/32941
PCT Pub. Date: May 10, 2001

(30) Foreign Application Priority Data

| Nov. 4, 1999 | (KR) | 1999-48645 |
| Dec. 20, 1999 | (KR) | 1999-59506 |
| Dec. 23, 1999 | (KR) | 1999-60749 |

(51) Int. Cl.$^7$ .............................................. C21B 11/00
(52) U.S. Cl. ...................... 75/379; 75/446; 75/450; 266/80; 266/88; 266/172
(58) Field of Search ................. 75/379, 446, 450; 266/80, 88, 172

(56) References Cited

U.S. PATENT DOCUMENTS

| 4,846,449 A | * | 7/1989 | Hauk et al. | 266/172 |
| 4,978,387 A | | 12/1990 | Kepplinger | 75/445 |
| 5,192,486 A | | 3/1993 | Whipp | |
| 5,413,622 A | | 5/1995 | Greenwalt | 75/446 |
| 5,961,690 A | * | 10/1999 | Kepplinger et al. | 75/446 |

FOREIGN PATENT DOCUMENTS

| WO | WO 97/13879 | 4/1997 | C21B/13/00 |
| WO | WO 97/13880 | 4/1997 | C21B/13/14 |

* cited by examiner

Primary Examiner—Melvyn Andrews
(74) Attorney, Agent, or Firm—Fish & Richardson P.C.

(57) ABSTRACT

A fluidized bed reduction reactor (100) for supplying a reduced iron to a melter-gasifier (1) of a smelting reduction system includes an exhaust gas supply unit (3) for supplying an exhaust gas to a reduction gas supply tube (4) interconnecting the melter-gasifier (1) and fluidized bed reduction furnaces (20, 30, 40) when the pressure of the reduction gas in each fluidized bed reduction furnace radically decreases with the occurrence of pressure peak in the melter-gasifier (1). The fluidized bed reduction reactors further include iron ore flow blockage prevention units for directly bypassing some of the reduction gas from each iron ore discharge tube (33, 43) disposed between the neighboring furnaces to the scrubber (50) when the inner pressure of the melter-gasifier (1) radically increases with the occurrence of pressure peak, and a backup gas supply unit supplying a backup nitrogen gas to the bottom of each fluidized bed reduction furnace when a nozzle of a distribution plate (24, 34, 44) is clogged.

27 Claims, 7 Drawing Sheets

FLUIDIZED BED BREAKAGE PREVENTION SYSTEM FOR FLUIDIZED BED REDUCTION REACTOR AND METHOD

BACKGROUND OF THE INVENTION (a) Field of the Invention

The present invention relates to a smelting reduction system, more particularly, to a fluidized bed reactor which supplies reduced iron to a melter-gasifier.

(b) Description of the Related Art

Generally, a blast furnace has been extensively used to make a molten iron through reducing and melting an iron ore. However, the blast furnace involves a drawback in that the charging materials should suffer pre-treatment to bear the form of sintered iron ore or cokes.

In order to solve such a problem, a fluidized bed reduction technique has been developed with the direct use of fine iron ore and coal without pre-treatment. U.S. Pat. No. 4,978,387 discloses such a technique in a typical manner.

The fluidized bed reduction technique disclosed therein is roughly based on a melter-gasifier and a fluidized bed reduction reactor. The melter-gasifier gasifier the coal charged therein to make a reduction gas, and melts the reduced iron fed from the fluidized bed reduction reactor. The fluidized bed reduction reactor utilizes the reduction gas generated from the melter-gasifier to reduce an iron ore in an indirect manner. The fluidized bed reduction reactor is provided with a pre-heating furnace for pre-heating the iron ore charged therein, a pre-reduction furnace for reducing the iron ore fed from the pre-heating furnace, and a final reduction furnace.

In operation, an iron ore is charged into the pre-heating furnace, and heated therein. The iron ore is then reduced while passing through the pre-reduction furnace and the final reduction furnace. The reduction gas generated from the melter-gasifier is sequentially flown into the final reduction furnace, the pre-reduction furnace, and the pre-heating furnace. It can be easily known that the flowing direction of the reduction gas is directly opposite to that of the iron ore. The reduced iron ore is continuously fed into the melter-gasifier where a deposit of coal is formed, and melt at the deposit to thereby make a molten iron.

The fluidized bed reduction reactor can be classified into a moving bed type and a fluidized bed type according to the state of contact between the iron ore and the reduction gas therein. Considering that the iron ore to be reduced has fine particles widely distributed in size, it can be known that the fluidized bed type is effectively employed for use in reducing the fine iron ore. The fluidized bed type refers to the technique where the reverse-current reduction gas is fed to a distribution plate provided at the bottom of each reduction furnace as a gas distributor, and reduces the iron ore charged therein while fluctuating the fine ore particles falling from the top side.

As the fluidized bed reduction furnace forms a fluidized bed through mixing the iron ore particles with the reverse-current reduction gas therein, the production efficiency largely depends upon the flowing state of the fine iron ore along the serially arranged furnaces, and the supply state of the reverse-current reduction gas.

In particular, when the reduction gas containing a large amount of dust passes through the nozzle of each distribution plate, the dust components may be gradually accumulated there. As a result, the non-fluidized iron ore particles drop to the bottom and clog the nozzle. In case the nozzle of the distribution plate is clogged, the flow of the reduction gas is blocked at the nozzle while deteriorating the working conditions in a serious manner.

Meanwhile, raw coal is combusted and gasified at the melter-gasifier to produce reduction gas, and the resulting reduction gas is differentiated in quantity depending upon the content and producing districts of the raw coal, and the working conditions. It has been noted that radical variation in the amount of the reduction gas product may reach up to 20–30% of the average quantity. Such a radical variation occurring for an extremely short time period is usually called the "pressure peak."

When such a pressure peak occurs in the fluidized bed reduction process, the amount of high temperature reduction gas fed to the respective fluidized bed reduction furnaces radically increases within a short time, and again, radically decreases.

When the amount of high temperature reduction gas radically increases with the occurrence of pressure peak, the amount of reduction gas fed to the respective reduction furnaces as well as to the gas supply lines interconnecting the furnaces also increases in a radical manner. Consequently, the large amount of reduction gas is flown along the lines in a high velocity while blocking the reverse-current iron ore flux. In a serious case, the iron ore flux may proceed in the opposite direction. Such a blockage of the iron ore flux is sustained for a relatively long time even after the pressure peak is extinguished away. This deteriorates the working conditions at the fluidized bed reduction reactor, and induces serious device failure.

Furthermore, in case the amount of high temperature reduction gas radically decreases with the occurrence of pressure peak, the flowing speed of the reduction gas also radically decreases so that the fluidized iron ore bed in each furnace may be temporarily broken. When the fluidized bed is broken, the fine iron ore particles broken away from the fluidized bed are gradually accumulated on the distribution plate placed at the bottom of the furnace while clogging the diffusion nozzle.

As described above, in order to make fluent working conditions in the fluidized bed reduction reactor, it is necessary that the reduction gas should be uniformly supplied thereto in a predetermined velocity while making the fluidized bed in a stable manner.

However, in the conventional fluidized bed reduction reactor, technical difficulties are involved in preventing blockage of the flow of the reduction gas or the iron ore, or the breakage of the fluidized bed.

SUMMARY OF THE INVENTION

It is an object of the present invention to provide a fluidized bed reduction reactor which can sustain the flow of iron ore and reduction gas in a stable manner.

It is another object of the present invention to provide a fluidized bed reduction reactor which can form a normal fluidized bed while ensuring the fluent flow of iron ore.

It is still another object of the present invention to provide a fluidized bed breakage prevention unit which can prevent temporary breakage of the fluidized bed with decrease in the reduction gas.

It is still another object of the present invention to provide an iron ore flow blockage prevention unit which can prevent blockage of the iron ore flux with the occurrence of pressure peak.

It is still another object of the present invention to provide a nitrogen gas supply unit which can supply nitrogen gas to the bottom of each fluidized bed reduction furnace through sensing the pressure difference and the temperature change therein.

These and other objects may be achieved by a fluidized bed reduction reactor for reducing fine iron ore and supplying the reduced iron ore to a melter-gasifier. The fluidized bed reduction reactor includes at least two or more fluidized bed furnaces pre-heating, pre-reducing, and finally reducing the charged fine iron ore with a reduction gas supplied from the melter-gasifier in a sequentially manner. A scrubber receives an exhaust gas from the pre-heating furnace via an exhaust tube, cools the exhaust gas, and scrubs fine particles contained in the exhaust gas. At least two or more iron ore discharge tubes inter-communicate the fluidized bed furnaces, and inter-communicate the final reduction furnace and the melter-gasifier to discharge the charged iron ore to the subsequent furnace or the melter-gasifier. At least two or more reduction gas supply tubes inter-communicate the fluidized bed furnaces, and inter-communicate the final reduction furnace and the melter-gasifier to supply the reduction gas generated from the melter-gasifier to each fluidized bed furnace. A fluidized bed stabilization unit stabilizes the fluidized bed when the fluidized bed in each fluidized bed furnace is broken due to the unstable supply of the reduction gas from the bottom.

The fluidized bed stabilization unit includes an exhaust gas supply unit. The exhaust gas supply unit supplies the exhaust gas to the reduction gas supply tube interconnecting the melter-gasifier and the fluidized bed reduction furnaces at the time point when the pressure of the reduction gas within the fluidized bed reduction furnaces radically decreases with the occurrence of pressure peak.

The fluidized bed stabilization unit may further include an iron ore flow blockage prevention unit. The iron ore flow blockage prevention unit directly bypasses some of the reduction gas from each iron ore discharge tube disposed between the neighboring furnaces to the scrubber at the time point when the inner pressure of the melter-gasifier radically increases with the occurrence of pressure peak.

The fluidized bed stabilization unit may still further include a backup gas supply unit. The backup gas supply unit supplies a backup nitrogen gas to the bottom of each fluidized bed reduction furnace when a nozzle of a distribution plate provided at the bottom of the fluidized bed reduction furnace is clogged.

The components of the fluidized bed stabilization unit may be provided in a separate manner, or in a combinatorial manner.

In order to stabilize the fluidized bed in each fluidized bed furnace, each iron ore discharge tube interconnecting the neighboring furnaces is intercepted at an initial working state. A fluidized bed is formed within each fluidized bed furnace through blowing the reduction gas into the furnace from the bottom, and charging the fine iron ore into the furnace from the top. The fluidized bed is grown in height such that the highest portion of the fluidized bed is placed at the same plane as the inlet of the corresponding iron ore discharge tube. The iron ore discharge tube is gradually opening the iron ore discharge tube after the fluidized bed is stabilized.

In the case of breakage of the fluidized bed, the fluidized bed stabilization unit is operated to recover and stabilize the broken fluidized bed.

In this way, the fluidized bed reactor can be operated for a long time in a stable manner, significantly enhancing production efficiency.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
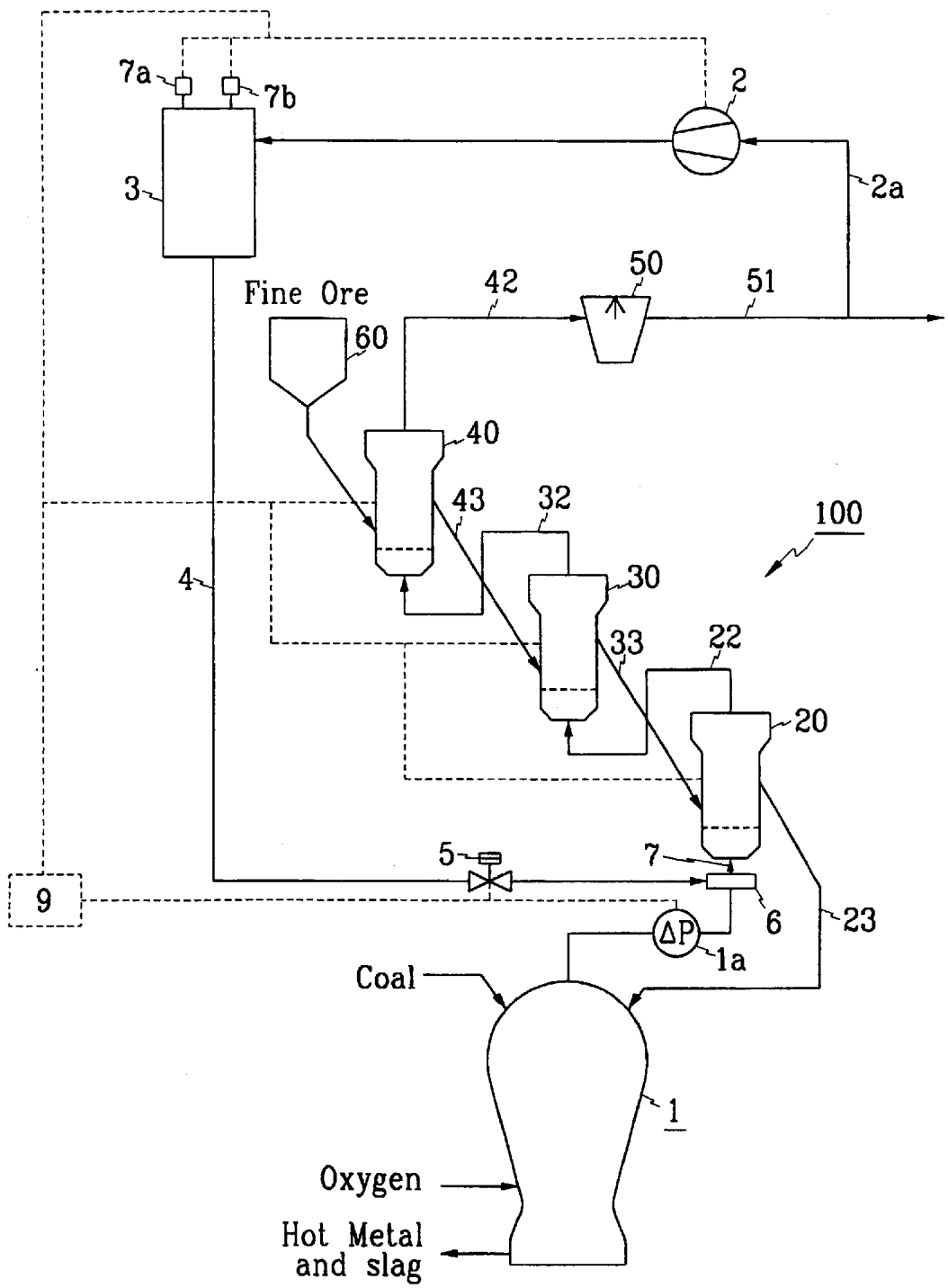
FIG. 1 is a schematic view of a fluidized bed reduction reactor with a fluidized bed breakage prevention unit according to a preferred embodiment of the present invention.

FIG. 1 illustrates a fluidized bed reduction reactor for a smelting reduction system according to a preferred embodiment of the present invention.

As shown in FIG. 1, the smelting reduction system includes a melter-gasifier 1 in which coal and reduced iron ore are charged to produce a molten iron, a fluidized bed reduction reactor 100 for indirectly reducing fine iron ore, and a fluidized bed stablization unit. The fluidized bed stabilization unit may be formed with a fluidized bed breakage prevention unit, an iron ore flow blockage prevention unit, and a backup gas supply unit, and will be described later in detail.

The fluidized bed reduction reactor 100 includes a pre-heating furnace 40, a pre-reduction furnace 30, a final reduction furnace 20, and first and second iron ore discharge tubes 43 and 33 interconnecting the furnaces 20, 30 and 40. The furnaces 40, 30 and 20 are arranged from the top to the bottom in a serial manner. Fine iron ore is continuously charged into the pre-heating furnace 40 at ambient temperature, and sequentially passes through the pre-reduction furnace 30 and the final reduction furnace 20 while contacting the high temperature reduction gas. In this process, the fine iron ore is reduced by 90% or more, and fed to the melter-gasifier 1.

Coal is continuously charged into the melter-gasifier 1 from the top, and form a deposit of coal therein at a predetermined height. When the coal content of the coal deposit is combusted in the presence of high temperature oxygen gas blown in from the top, high temperature reduction gas is generated therein, and fed to the final reduction furnace 20.

Meanwhile, when pressure peak occurs at the melter-gasifier 1 in the process of generating the high temperature reduction gas while radically lowering the inner pressure, the fluidized bed breakage prevention unit according to the present invention feeds an exhaust gas to the fluidized bed reduction reactor 100 air-communicated with the melter-gasifier 1. That is, the fluidized bed breakage prevention unit collects the gas exhausted from the pre-heating furnace, and feeds the collected exhaust gas to a reduction gas supply tube 7 interconnecting the melter-gasifier 1 and the final reduction furnace 20.

As shown in FIG. 1, the fluidized bed breakage prevention unit includes an exhaust gas guide tube 2a provided at the rear of a water scrubber 50 such that it can diverge some of the exhaust gas, a compressor 2 for compressing the collected exhaust gas, a compressed gas storage vessel 3 for storing the compressed exhaust gas, a control valve 5 for controlling the pressure of the compressed gas, a nozzle 6 for supplying the pressure-controlled gas to the final reduction furnace 20, and an exhaust gas supply tube 4 interconnecting the respective components.

The compressed gas storage vessel 3 has a volume capable of storing 20–30% of the average quantity of reduction gas generated from the melter-gasifier 1. Furthermore, the compressed gas storage vessel 3 is provided with a plurality of pressure control switches 7a and 7b for keeping the inner pressure of the vessel 3 to be 1.5 to 2 times greater than the pressure applied to the melter-gasifier 1.

The pressure control valve 5 provided at the exhaust gas supply tube 4 interconnecting the compressed gas storage vessel 3 and the nozzle 6 controls the flow of the exhaust gas along the exhaust gas supply tube 4 upon receipt of signals from a process control computer 9.

Figure 2:
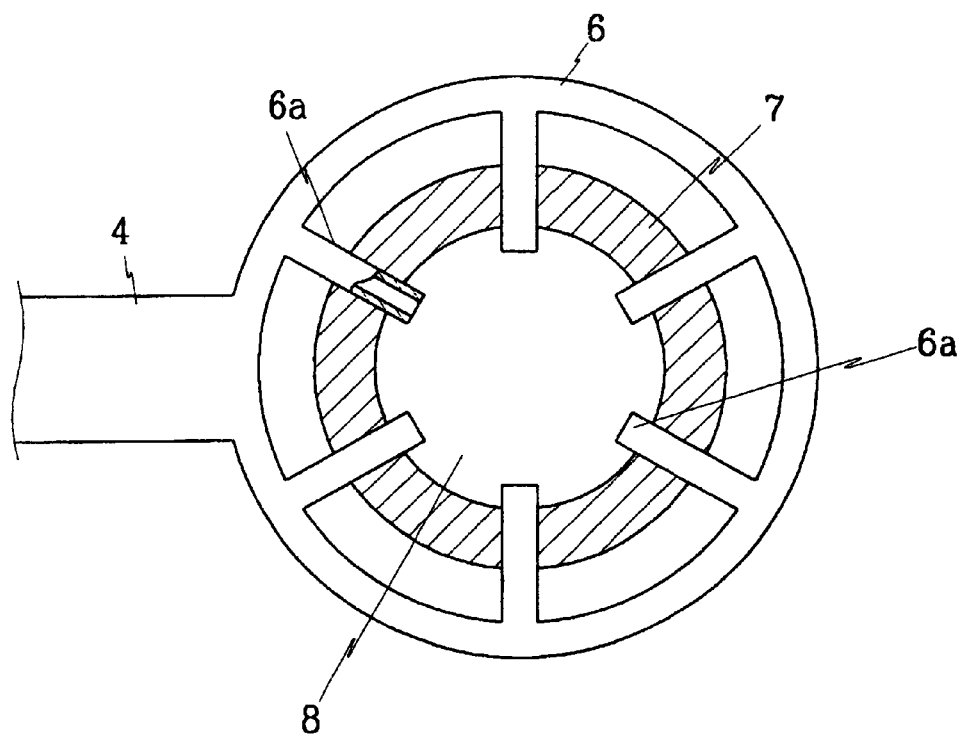
FIG. 2 is a plan view of an exhaust gas supply nozzle for the fluidized bed breakage prevention unit shown in FIG. 1.

As shown in FIG. 2, the compressed gas supply nozzle 6 is provided at the reduction gas supply tube 7 interconnecting the melter-gasifier 1 and the final reduction furnace 20. In order to blow the exhaust gas in the internal space 8 of the reduction gas supply tube 7, the compressed gas supply nozzle 6 is provided with a circular tube portion externally surrounding the reduction gas supply tube 7, and a plurality of linear tube portions 6a branched from the circular tube portion while passing through the reduction gas supply tube 7 to the internal space thereof 8. The number of the branched linear tube portions 6a of the compressed gas supply nozzle 6 is preferably established to be six (6) to eight (8).

When the reduction gas is supplied from the melter-gasifier 1 to the final reduction furnace 20 through the internal space 8 of the reduction gas supply tube 7, the above-structured compressed gas supply nozzle 6 also supplies the compressed gas from the compressed gas storage vessel 3 to the final reduction furnace 20.

The way of operating the fluidized bed breakage prevention unit will be now described.

The high temperature reduction gas generated from the melter-gasifier 1 is primarily fed to the final reduction furnace 20, and sequentially passes through the pre-reduction furnace 30 and the pre-heating furnace 40 while reducing the charged fine iron ore. The reduction gas is then exhausted via the water scrubber 50.

The exhaust gas is partially fed to the compressor 2 via the exhaust gas guide tube 2a provided at the rear of the water scrubber 50, and compressed there. The compressed gas is stored at the compressed gas storage vessel 3. At this time, the two pressure contorl switches 7a and 7b are operated in synchronization with the compressor 2 such that the inner pressure of the gas storage vessel 3 can be kept to be constant.

Meanwhile, the pressure of the reduction gas generated from the melter-gasifier 1 is measured by a pressure sensor 1a in a continuous manner. The pressure value measured at the pressure sensor 1a is transmitted to the process control computer 9. The process control computer 9 calculates the pressure varying speed in each furnace, and detects the occurrence of pressure peak when the calculated value is 0.05 bar/sec.

When the process control computer 9 detects the occurrence of pressure peak, the pressure control valve 5 provided at the compressed gas supply tube 4 opens, and the compressed gas is fed to the final reduction furnace 20 in a uniform manner.

The blowing in of the compressed gas is preferably made at the time point when the inner pressure of the melter-gasifier 1 radically increases with the occurrence of pressure peak, and again radically decreases. The blowing in of the compressed gas is blocked through intercepting the pressure control valve 5 when the pressure varying speed in each furnace is reduced to be 0.05 bar/sec or less.

In short, when the compressed gas is supplied to each furnace by the volume corresponding to the decreased volume of reduction gas at the time point when the volume of reduction gas radically decreases with the occurrence of pressure peak, radical decrease in the gas flux at the furnace is prohibited while preventing possible breakage of the fluidized iron ore bed therein.

Figure 3:
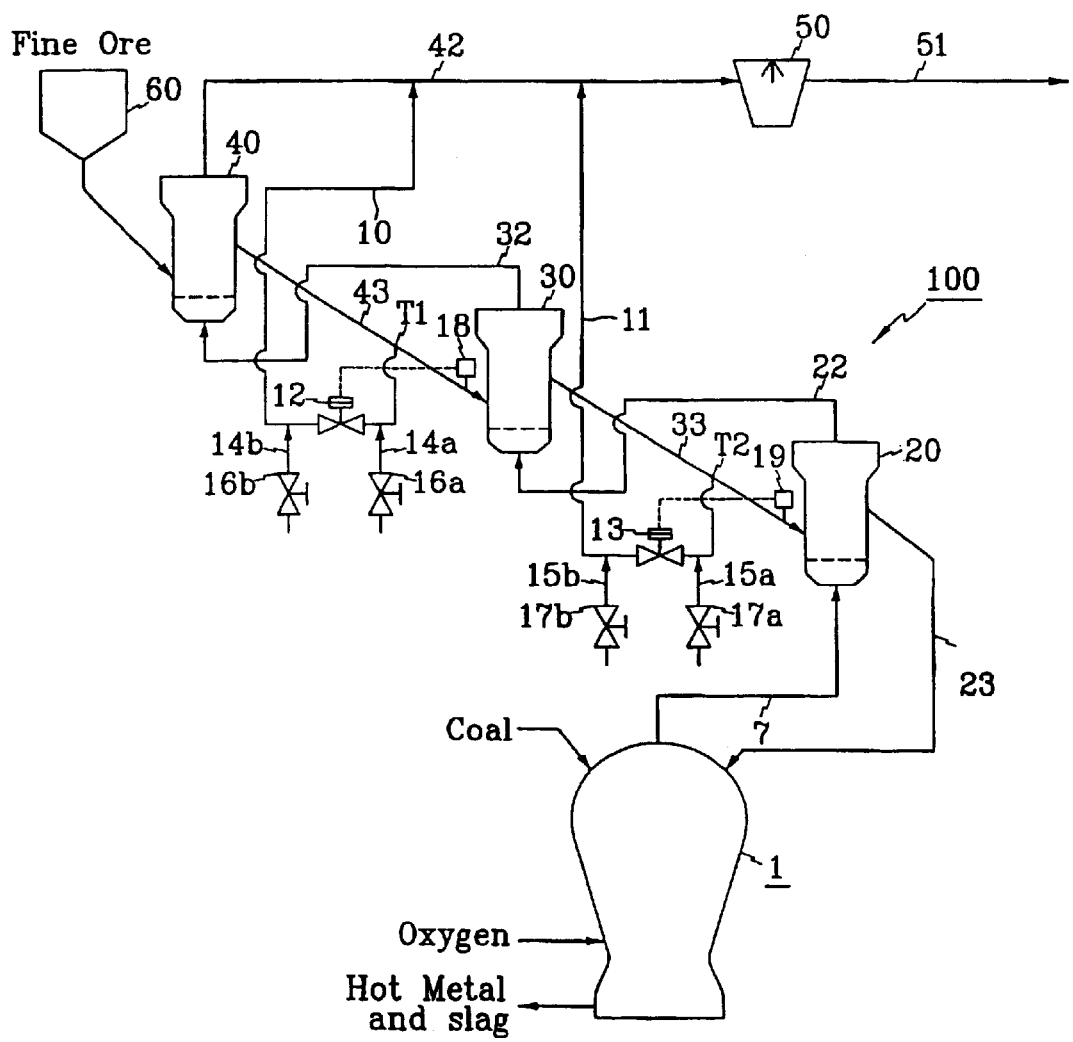
FIG. 3 is a schematic view of an iron ore flow blockage prevention unit for the fluidized bed reduction reactor shown in FIG. 1.

The iron ore flow blockage prevention unit for the fluidized bed reduction reactor will be now described with reference to FIG. 3.

The iron ore flow blockage prevention unit is to directly bypass some of the reduction gas in the first and second iron ore discharge tubes 43 and 33 interconnecting the furnaces 20, 30 and 40 toward the water scrubber 50 in the occurrence of pressure peak within the melter-gasifier 1.

The iron ore flow blockage prevention unit includes a first bypass tube 10 provided at the first iron ore discharge tube 43 between the pre-heating furnace 40 and the pre-reduction furnace 30, a second bypass tube 11 provided at the second iron ore discharge tube 33 between the pre-reduction furnace 30 and the final reduction furnace 20, and switching valves 12 and 13 provided at the first and second bypass tubes 10 and 11. The first and second bypass tubes 10 and 11 communicate with an exhaust tube 42 interconnecting the pre-heating furnace 40 and the water scrubber 50.

Nitrogen gas purging tubes 14 and 15 are provided at the front and the rear of the switching valves 12 and 13 of the first and second bypass tubes 10 and 11, respectively. The nitrogen gas purging tubes 14a and 15a placed at the front of the switching valves 12 and 13 prevent the fine iron ore from being flown into the first and second bypass tubes 10 and 11, and purge the fine iron ore toward the pre-reduction furnace 30 or the final reduction furnace 20. The nitrogen gas purging tubes 14b and 15b placed at the rear of the switching valves 12 and 13 blow nitrogen gas toward the exhaust tube 42. Furthermore, control valves 16a, 16b, 17a and 17b are provided at the nitrogen gas purging tubes 14a, 14b, 15a and 15b to control the supply of nitrogen gas in an appropriate manner.

Meanwhile, in order to sense and measure variations in the pressure applied to the first and second iron ore discharge tubes 43 and 33, first and second pressure sensors 18 and 19 are provided at the end portions of the iron ore discharge tubes 43 and 33 close to the pre-reduction furnace 30 and the final reduction furnace 20, respectively. The process control computer 9 determines switching of the switching valves 12 and 13 based on the pressure value measured at the first and second pressure sensors 18 and 19.

The positions T1 and T2 where the first and second bypass tubes 10 and 11 are connected to the first and second iron ore discharge tubes 43 and 33 are preferably placed at the same level as or higher than the highest portion of the fluidized bed in the pre-reduction furnace 30 or the final reduction furnace 20. In this structure, even with the occurrence of pressure peak, the fine iron ore is prevented from flowing into the first and second bypass tubes 10 and 11.

The first and second bypass tubes 10 and 11 are formed with a heat-resistant steel capable of well enduring against the high temperature reduction gas, and the diameters thereof are preferably established to be ½ of those of the first and second iron ore discharge tubes 43 and 33.

The way of operating the iron ore flow blockage prevention unit will be now described.

In case the iron ore reduction process is normally performed at the respective furnaces 40, 30 and 20 so that the pressure peak does not occur, the switching valves 12 and 13 are kept to be in a closed state. In this case, the high temperature reduction gas fed from the melter-gasifier 1 normally flows along first and second gas supply tubes 22 and 32, and the exhaust tube 42 in a sequential manner.

When the flow of reduction gas is normally made, the control valves 16a, 16b, 17a and 17b open to supply nitrogen gas to the appropriate tubes while taking the closed switching valves 12 and 13 as boundaries. In this way, the flow of exhaust gas from the exhaust tube 42 to the first and second bypass tubes 10 and 11 is blocked, and the flow of alien materials and fine iron ore from the first and second iron ore discharge tubes 43 and 33 to the first and second bypass tubes 10 and 11 is also blocked.

However, when the high temperature reduction gas is over-flown toward the first and second iron ore discharge tubes 43 and 33 with the occurrence of the pressure peak in the melter-gasifier 1, the pressure sensors 1a, 18 and 19 sense the over-flow of the reduction gas, and transmit the sensed results to the process control computer 9. The process control computer 9 analyses the input signals, and calculates the pressure varying speed of the reduction gas. When the calculated value is 0.05 bar/sec, the computer 9 detects the occurrence of pressure peak.

In case the value measured at the pressure gauges 18 and 19 goes over the established reference value, the computer 9 instructs to open the first or the second switching valve 12 or 13. When the first or the second switching valve 12 or 13 opens, the exhaust tube 42, the first and second bypass tubes 10 and 11, and the first and second iron ore discharge tubes 43 and 43 are communicated with each other. As a result, the large amount of high temperature reduction gas introduced into the first and second iron ore discharge tubes 43 and 33 and elevated upwards is bypassed to the exhaust tube 42 via the first and second bypass tubes 10 and 11.

Since the reduction gas is bypassed in the above way, the flow of the reduction gas in the direction opposite to the flowing direction of the iron ore in the first and second iron ore discharge tubes 43 and 33 can be prevented while ensuring the fluent flow of the iron ore without blockage. Furthermore, the reverse-flow of the iron ore from first and second iron ore discharge tubes 43 and 33 to the pre-heating furnace 40 or the pre-reduction furnace 30 is also prevented.

The reference value of the pressure varying speed is established to be differentiated at the rear portions of the pre-reduction furnace 30 and the final reduction furnace 20, respectively. The value of the pressure varying speed measured at the pressure sensor 18 of the pre-reduction furnace 30 is established to be 0.05 bar/sec or more, and the value of the pressure varying speed measured at the pressure sensor 19 of the final reduction furnace to be 0.03 bar/sec or more.

Figure 4:
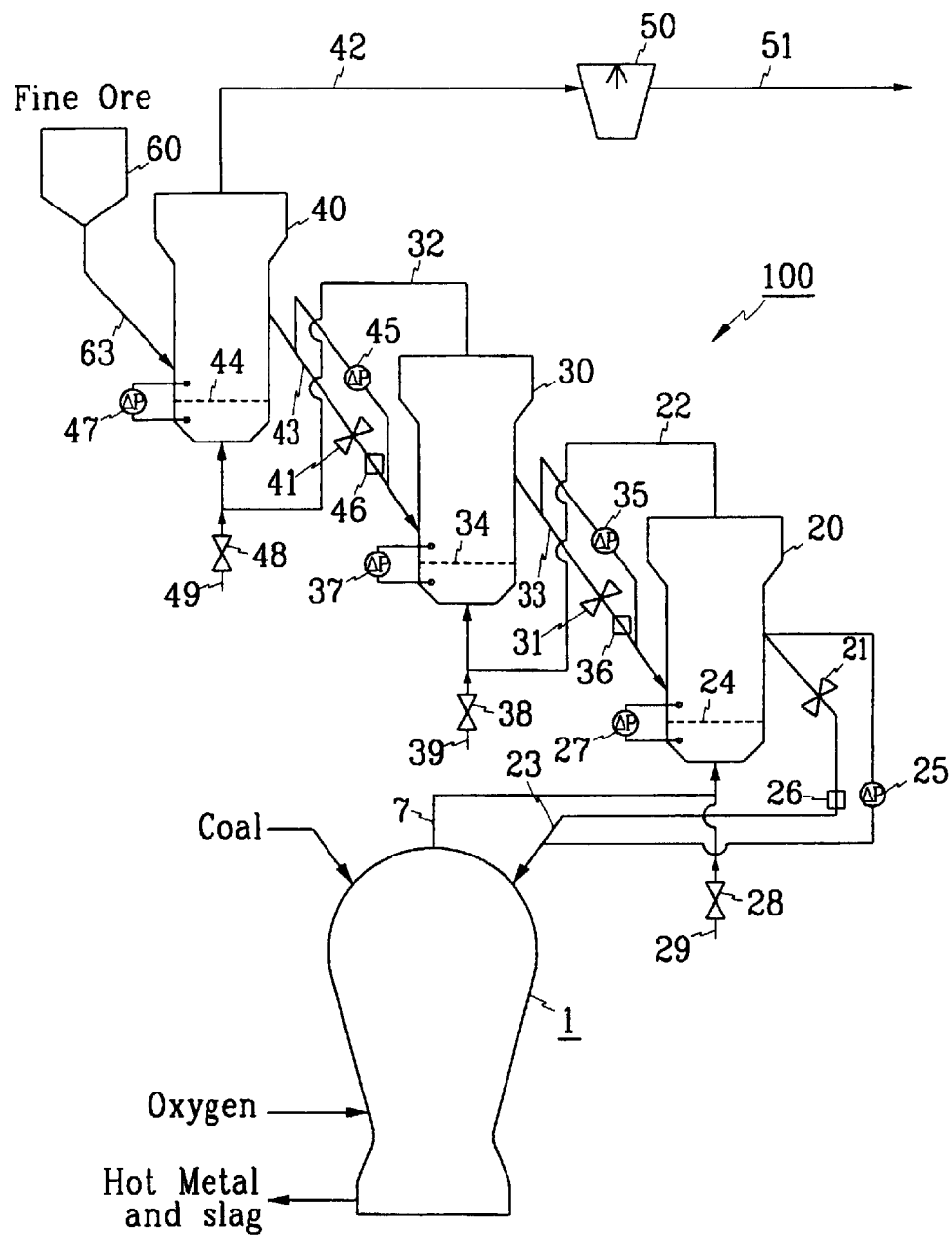
FIG. 4 is a schematic view of a backup gas supply unit for the fluidized bed reduction reactor shown in FIG. 1.

The backup gas supply unit will be now described with reference to FIG. 4.

Distribution plates 24, 34 and 44 each with a nozzle are provided at the bottom of the final reduction furnace 20, the pre-reduction furnace 30 and the pre-heating furnace to distribute the reduction gas generated from the melter-gasifier therein.

When the nozzles of the distribution plates 24, 34 and 44 are clogged, the backup gas supply unit feeds the backup nitrogen gas to the bottom of the furnaces 20, 30 and 40.

The back gas supply unit includes discharge control valves 41, 31 and 21 provided at the respective iron ore discharge tubes 43, 33 and 23, first differential pressure sensors 45, 35 and 25 for detecting the differential pressure between the inlet and outlet sides of the iron ore discharge tubes 43, 33 and 23, second differential pressure sensors 47, 37 and 27 for detecting the differential pressure between the top and bottom sides of the distribution plates 24, 34 and, 44, and backup gas supply tubes 49, 39 and 29 for supplying the backup gas to the bottom of the respective furnaces 40, 30 and 20.

The discharge control valves 41, 31 and 21 are to intercept the reduction gas reverse-flown in the iron ore discharge tubes 43, 33 and 23 while controlling the iron ore to be flown in the normal flowing direction.

The first differential pressure sensors 45, 35 and 25 are positioned between the top and bottom ends of the iron ore discharge tubes 43, 33 and 23 while interposing the discharge control valves 41, 31 and 21. Thermometers 46, 36 and 26 are installed at the front portions of the respective discharge control valves 41, 31 and 21 to detect radical temperature variation of the reduction gas reverse-flown in the iron ore discharge tubes 43, 33 and 23 when the nozzles of the distribution plates 44, 34 and 24 are clogged.

The second differential pressure sensors 47, 37 and 27 are positioned between the top and bottom sides of the distribution plates 44, 34 and 24.

The backup gas supply tubes 49, 39 and 29 are provided at the respective reduction gas supply tubes 7, 22 and 32 with switching valves 48, 38 and 28 for controlling the amount of nitrogen gas to be blown in each furnace.

The way of operating the backup gas supply unit will be now described. For this purpose, the initial operating process of the smelting reduction system will be first clarified.

In the operating process of the smelting reduction system, fine iron ore is charged into the pre-heating furnace 40 via an iron ore charging tube 63 from a charging bin 60, and passes through the pre-reduction furnace 30 and the final reduction furnace 20 while being fluidized and reduced. The reduced iron ore is charged into the melter-gasifier 1. Meanwhile, the reduction gas generated from the melter-gasifier 1 due to the burning of coal is sequentially blown into the final reduction furnace 20, the pre-reduction furnace 30 and the pre-heating furnace 40 from the bottom thereof via the respective reduction gas supply tubes 7, 22 and 32. The reduction gas introduced into the respective furnaces 40, 30 and 20 is diffused toward the top thereof by the respective distribution plates 44, 34 and 24 in a uniform way, and reacts with the iron ore to reduce it while forming a fluidized bed.

In the initial processing steps, when the discharge control valve 41 provided at the iron ore discharge tube 43 interconnecting the pre-heating furnace 40 and the pre-reduction furnace 30 opens, and the reduction gas is blown into the bottom of the pre-heating furnace 40 via the corresponding reduction gas supply tube 32, a large amount of gas is flown along the iron ore discharge tube 43.

Consequently, the iron ore charged in the pre-heating furnace 40 is not fluidized in a fluent manner, and settles down on the distribution plate 44 while clogging the nozzle thereof. The differential pressure at the distribution plate 44 is increased with the phenomenon of non-fluidization of the iron ore within the pre-heating furnace 40 so that the iron ore cannot be heat-treated in an effective manner. The increase in the differential pressure at the distribution plate 44 is accompanied by the increase in the density of iron ore in the pre-heating furnace 40. As a result, the outlet of the iron ore charging tube 63 is clogged, and the overall molten iron making process is stopped.

For that reason, when iron ore is initially charged into the pre-heating furnace 40, the discharge control valve 41 of the iron ore discharge tube needs to be closed such that the reduction gas is introduced only into the bottom of the distribution plate 44 of the pre-heating furnace 40. In this state, as the iron ore fluidized bed formed within the pre-heating furnace 40 is elevated in height up to the same level as the inlet of the iron ore discharge tube 43, the discharge control valve opens 41 gradually, and the iron ore is discharged through the iron ore discharge tube 43, thereby stabilizing the fluidized bed.

When the height of the fluidized bed is placed at the level higher than the outlet of the discharge control valve 41, the discharge of the iron ore from the pre-heating furnace 40 to the iron ore discharge tube 43 is fluently made even in the opening state of the discharge control valve 41, and the reduction gas is not reverse-flown.

The fluidized beds within the pre-reduction furnace 30 and the final reduction furnace 20 can be also stabilized in the same way as with that of the pre-heating furnace 40. That is, the discharge control valves 41, 31 and 21 are closed in the initial working condition, and opening gradually or periodically depending upon the degree of stabilization of the fluidized bed in each furnace to thereby discharge the iron ore in a fluent manner.

In case the fluidized bed in each furnace becomes to be unstable due to possible failures, a sensor detects such a state.

First, the nozzles of the distribution plates 24, 34 and 44 may become to be gradually clogged due to the large amount of dust contained in the reduction gas, or the iron ore particles released from the fluidized bed. When the distribution plates 24, 34 and 44 are clogged, difference in pressure is generated between the top and bottom of each distribution plate, and sensed by the second differential pressure sensors 47, 37 and 27.

When the value of the differential pressure measured at the differential pressure sensors 47, 37 and 27 turns out to go over the reference is value, it is detected that the fluidized bed in each furnace becomes to be unstable, and the blowing in of the reduction gas through the distribution plates 24, 34 and 44 is not made in an appropriate manner. In this state, the charge and discharge of the iron ore into and from each furnace becomes to be unsettled, and the reduction gas required for forming the fluidized bed is not normally supplied. Consequently, the fluidized bed is formed only slightly over the distribution plates 24, 34 and 44 while speeding up the clogging of the nozzles thereof. In a serious case, the iron ore is reverse-flown into the iron ore charging bin 60, the pre-heating furnace 40 or the pre-reduction furnace 30 together with the reduction gas via the corresponding iron ore discharge tube, thereby extinguishing the fluidized bed in each furnace.

It may be considered that when the reduction gas is flown into the iron ore discharge tubes 23, 33 and 43, the discharge control valves 21, 31 and 41 are controlled to be closed, thereby preventing the flow of the reduction gas and the reverse-flow of the iron ore toward the iron ore discharge tubes 23, 33 and 43. However, since the temperature of the reduction gas flowed into the iron ore discharge tubes 23, 33 and 43 is extremely high while being accompanied with radical increase in temperature at the flowing path, the discharge control valves 21, 31 and 41 on the path cannot be operated in a fluent manner.

In case the second differential pressure sensors 47, 37 and 27 detect the clogging of the nozzles of the distribution plates 24, 34 and 44, such a nozzle clogging defect can be effectively removed in the following way. In the normal working conditions, the pressure difference between the top and the bottom of the distribution plates is usually established to be in the range of 100–300 mmbar. Therefore, the differential pressure measured at the differential pressure gauges 47, 37 and 27 radically increases to go over 300 mmbar, it is determined that the distribution plates 24, 34 and 44 are clogged.

In such a case, the process control computer 9 instructs to open the switching valves 28, 38 and 48 provided at the backup gas supply tubes 49, 39 and 29, and feeds the backup nitrogen gas to the furnaces 20, 30 and 40 via the backup gas supply tubes 49, 39 and 29. The nitrogen gas purges the distribution plates 24, 34 and 44 to thereby drop the differential pressure between the top and the bottom of thereof. After the nozzle clogging defect is removed and the least fluidized state is maintained, the discharge control valves 21, 31 and 41 are closed, and the supply of the nitrogen gas is stopped while keeping the normal flow of the reduction gas to be constant.

When the reduction gas is reverse-flown in the iron ore discharge tubes 23, 33 and 43 due to the clogging of the distribution plates 24, 34 and 44, pressure difference is made between the inlet and the outlet of the iron ore discharge tubes 23, 33 and 34. The differential pressure is measured at the first differential pressure sensors 45, 35 and 25.

When the differential pressure radically decreases to go down below 100 mmbar, it is determined that the reduction gas is reverse-flown in the iron ore discharge tubes 23, 33 and 43. In this case, it is established that the discharge control valves 21, 31 and 41 are closed at once. However, in case the operation of the discharge control valves 21, 31 and 41 becomes to be impossible, the switching valves 28, 38 and 48 opens to supply nitrogen gas to the bottom of the relevant furnaces. After the nozzle clogging defect of the distribution plates 24, 34 and 44 is removed due to the purging operation of the nitrogen gas and the least fluidized state is maintained, the discharge control valves 21, 31 and 41 are closed, and the supply of the nitrogen gas is stopped while keeping the normal flow of the reduction gas to be constant.

Finally, when the reduction gas is reverse-flown in the iron ore discharge tubes 23, 33 and 43, the temperature thereof is radically elevated. In this case, the elevated temperature is measured at the thermometers 26, 36 and 46 in the iron ore discharge tube 23, 33 and 43.

When the measured temperature exceeds by 50° C. more than the reference value, the switching valves 28, 38 and 48 opens to supply nitrogen gas to the bottom of the relevant furnaces.

After the nozzle clogging defect is removed due to the purging operation of the nitrogen gas and the least fluidized state is maintained, the discharge control valves 21, 31 and 41 are closed, and the supply of the nitrogen gas is stopped while keeping the normal flow of the reduction gas to be constant.

As described above, the breakage of the fluidized bed due to the clogging of the distribution plates are measured by the first differential pressure sensors 45, 35 and 25, the second differential pressure sensors 47, 37 and 27, or the thermometers 26, 36 and 46. When it is determined that abnormal conditions are made in the furnaces, nitrogen gas is supplied to the relevant furnaces to recover the broken fluidized bed. Thereafter, the discharge control valves 21, 31 and 41 open to proceed the normal reduction process in a stable manner.

The following examples further illustrate the present invention.

The specification and experimental conditions for the fluidized bed reduction reactor of the smelting reduction system were like the below.

(a) Specification of the fluidized bed reactor (the pre-heating Furnace, the pre-reduction furnace, and the final reduction furnace)

Radius of the reduced portion (the distribution plate): 0.3 m

Radius of the amplified portion: 0.7 m

Angle of the conical shaped bottom portion: 4°

Height of the inclined portion (from the top of the distribution plate): 4.0 m

Height of cylindrical shaped top portion: 2.5 m

Depth of the bottom portion under the distribution plate: 3.0 m (b) Fine iron ore Partical (grain) size of the fine iron ore: 8 mm or less Particle size distribution:

0.05 mm or less: 4.6%, 0.05–0.15 mm: 5.4%, 0.15–0.5 mm: 16.8%, 0.5–4.75 mm: 59.4% 4.75–8 mm: 13.8%

Chemical composition of the fine iron ore:

T.Fe: 62.17%, FeO: 0.51%, $SiO_2$: 5.5%, $TiO_2$: 0.11%, Mn: 0.05%, S: 0.012% P: 0.65%, Number of crystals: 2.32%

(c) Reduction Gas

Chemical composition

CO: 65%, $H_2$: 25%, $CO_2$: 5%, $N_2$: 5%

Temperature of the fluidized bed reactor

Final reduction furnace: 850° C.,
Pre-reduction furnace: 800° C.,
Pre-heating furnace: 750° C.

Speed of flow:

Normal state: 1.7 m/s (distribution plate)

Pressure: 2.5–3.0 bar/g

EXAMPLE 1

Figure 5:
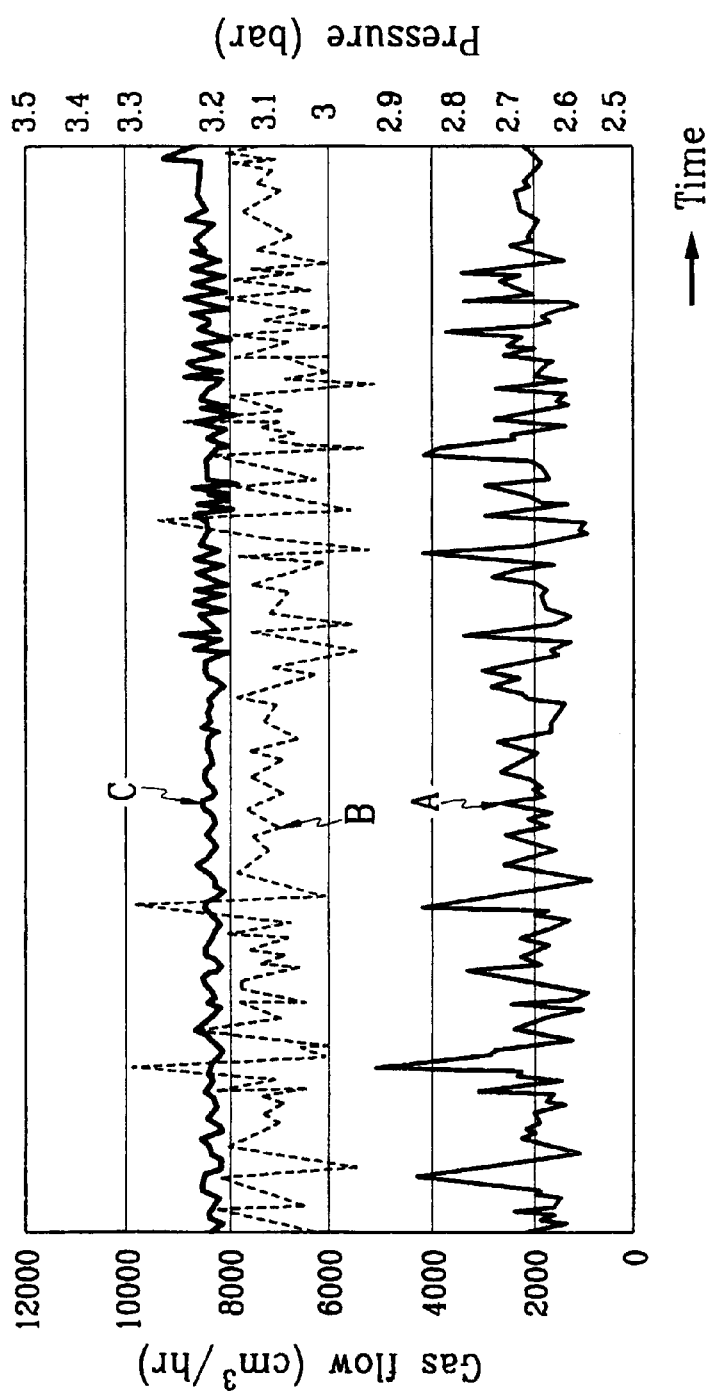
FIG. 5 is a graph illustrating variations in the reduction gas flux with or without the fluidized bed breakage prevention unit shown in FIG. 1.

The variations in flux of the reduction gas with or without the fluidized bed breakage prevention unit were compared with each other, and the results are illustrated in FIG. 5.

In the drawing, A indicates the occurrence of pressure peak in the melter-gasifier, B indicates the flux of the reduction gas at the inlet of the fluidized bed furnace, and C indicates the flux of the reduction gas at the outlet of the fluidized bed furnace.

As shown in FIG. 5, it turned out that when the pressure peak occurs within the melter-gasifier, variation in the flux of the reduction gas is significantly decreased with the fluidized bed breakage prevention unit.

Therefore, with the occurrence of pressure peak, as the compressed exhaust gas is supplied to the final reduction furnace at the time point when the flux of the reduction gas radically decreases, the fluidized bed can be effectively prevented from being broken.

EXAMPLE 2

Figure 6:
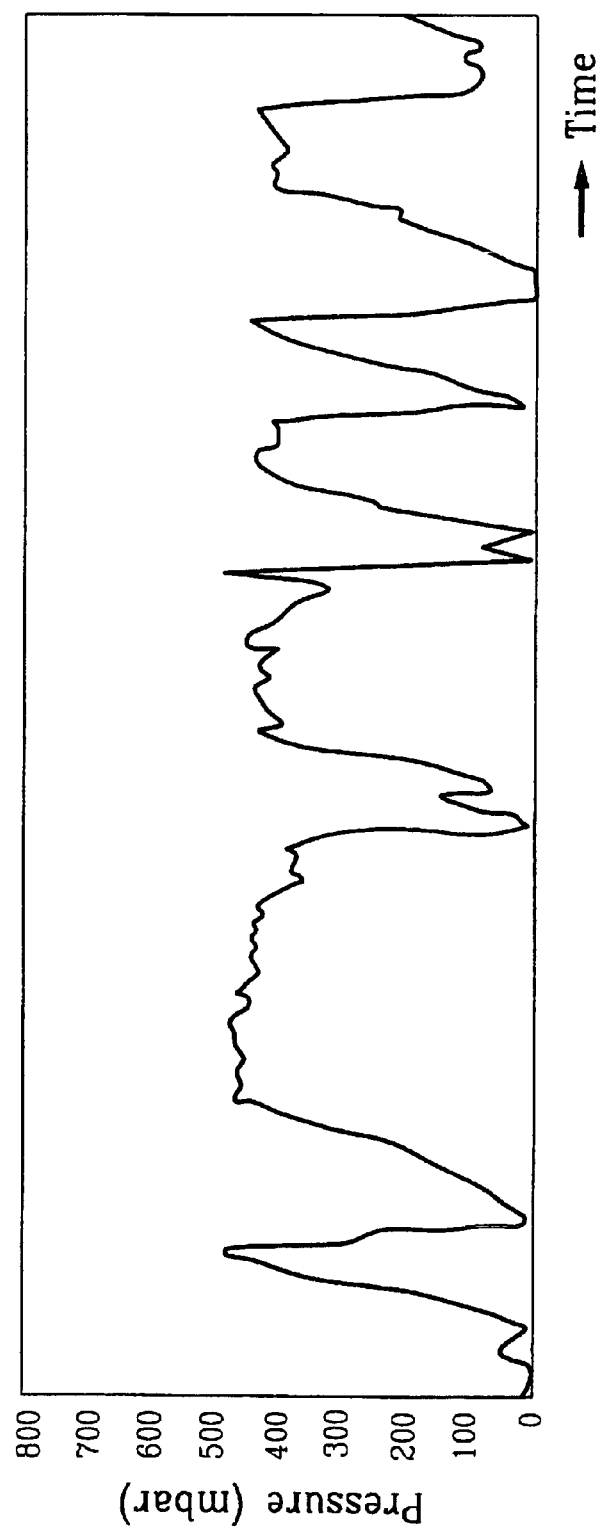
FIG. 6 is a graph illustrating the pressure difference at the front and the rear of an iron ore discharge tube for the fluidized bed reduction reactor shown in FIG. 1 with the occurrence of pressure peak.
Figure 7:
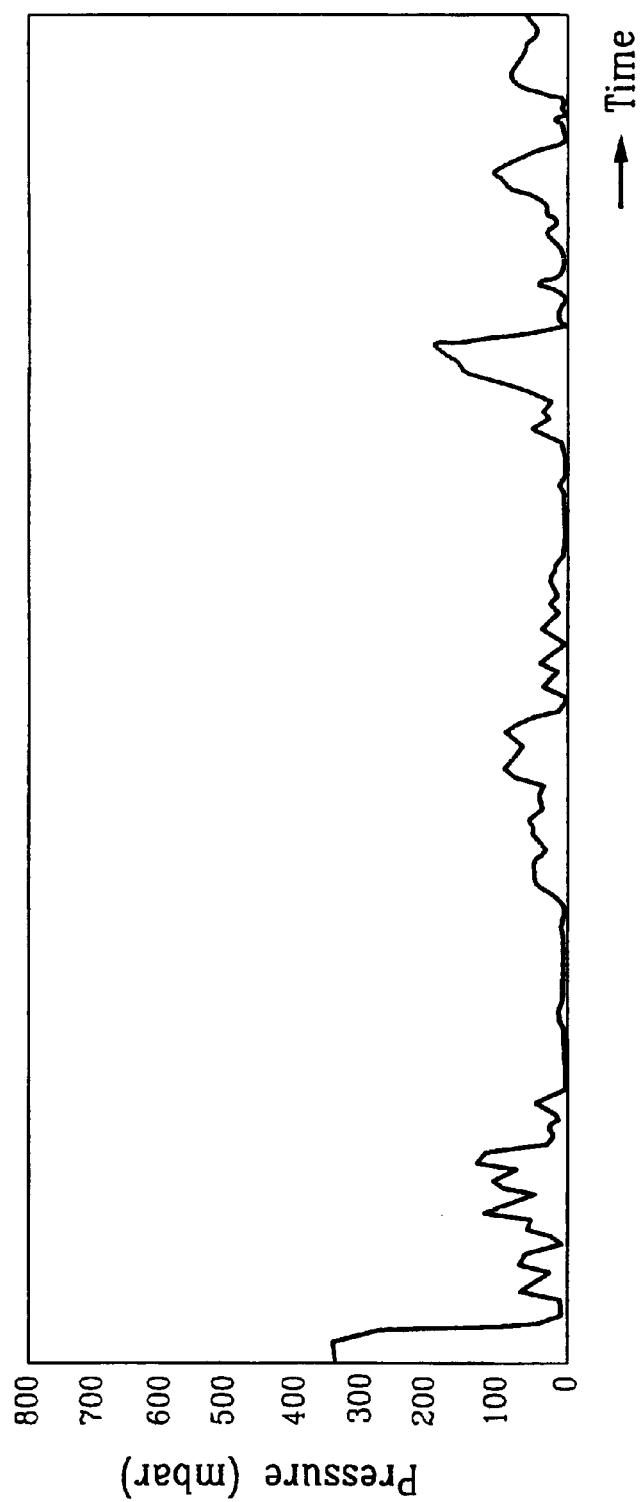
FIG. 7 is a graph illustrating the pressure difference at the front and the rear of an iron ore discharge tube for the fluidized bed reduction reactor shown in FIG. 1 after the iron ore flow blockage prevention unit is operated.

The pressure difference between the front and the rear of the iron ore discharge tube in the absence or presence of the iron ore flow blockage prevention unit was measured, and the results are illustrated in FIGS. 6 and 7.

As shown in FIG. 6, in the absence of the iron ore flow blockage prevention unit, the flow of iron ore was blocked or reversed in the iron ore discharge tube with the occurrence of pressure peak, and the pressure difference was made in a radical manner.

However, in the presence of the iron ore flow blockage prevention unit, as shown in FIG. 7, the pressure difference initially increased in a slight manner, and then, decreased. It was presumed that with the occurrence of pressure peak, the large amount of high temperature reduction gas introduced into the iron ore exhaust tube is bypassed to the exhaust tube 42 via the bypass tubes, and hence, the pressure difference between the top and the bottom of the iron ore discharge tube is decreased.

Therefore, the iron ore flow blockage prevention unit can effectively prevent the blockage of flow or the reverse-flow of the iron ore between the furnaces.

EXAMPLE 3

The time of working with or without the backup gas supply unit was measured, and the results are given in Table 1.

TABLE 1

| Experimental condition (backup gas supply unit) | Average normal working time (Hr) | Normal working re-initiating time (Hr) |
| --- | --- | --- |
| Absence | 60 | 120 |
| Presence | 240 | 5 |

As indicated in table 1, with the installation of the backup gas supply unit, the working time could be significantly increased, and the normal working could be rapidly re-initiated even with the breakage of the fluidized bed.

Furthermore, the other working circumstances were like the below. The utilization rate of gas was about 30–35%, and the amount of gas consumption per one ton of fine iron ore was 1300–1500 $Nm^3$/ton-ore. The reduction rate of the fine iron ore charged into the pre-reduction furnace 30 from the pre-heating furnace 40 was 10–15%, that of the pre-reduced iron ore charged into the final reduction furnace 20 from the pre-reduction furnace 30 was 30–40%, and that of the reduced iron ore charged into the melter-gasifier 1 from the final reduction furnace 20 was 85–90%.

Therefore, in the presence of the backup gas supply unit, possible temporary working failure can be rapidly repaired while making it possible to operate the fluidized bed reactor for a long time in a stable manner.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A fluidized bed reduction reactor for reducing fine iron ore and supplying the reduced iron ore to a melter-gasifier, the fluidized bed reduction reactor comprising:

at least two or more fluidized bed furnaces pre-heating, pre-reducing, and finally reducing the charged fine iron ore with a reduction gas supplied from the melter-gasifier in a sequentially manner;
a scrubber receiving an exhaust gas from the final reduction furnace via an exhaust tube, cooling the exhaust gas, and scrubbing fine particles contained in the exhaust gas;
at least two or more iron ore discharge tubes intercommunicating the fluidized bed furnaces and intercommunicating the final reduction furnace and the melter-gasifier to discharge the charged iron ore to the subsequent furnace or the melter-gasifier;
at least two or more reduction gas supply tubes intercommunicating the fluidized bed furnaces and intercommunicating the final reduction furnace and the melter-gasifier to supply the reduction gas generated from the melter-gasifier to each fluidized bed furnace; and
a fluidized bed stabilization unit for stabilizing the fluidized bed when the fluidized bed in each fluidized bed furnace is broken due to the unstable supply of the reduction gas from the bottom.

2. A fluidized bed reduction reactor for reducing fine iron ore and supplying the reduced iron ore to a melter-gasifier, the fluidized bed reduction reactor comprising:
at least two or more fluidized bed furnaces pre-heating, pre-reducing, and finally reducing the charged fine iron ore with a reduction gas supplied from the melter-gasifier in a sequentially manner;
a scrubber receiving an exhaust gas from the final reduction furnace via an exhaust tube, cooling the exhaust gas, and scrubbing fine particles contained in the exhaust gas;
at least two or more iron ore discharge tubes intercommunicating the fluidized bed furnaces and intercommunicating the final reduction furnace and the melter-gasifier to discharge the charged iron ore to the subsequent furnace or the melter-gasifier;
at least two or more reduction gas supply tubes intercommunicating the fluidized bed furnaces and intercommunicating the final reduction furnace and the melter-gasifier to supply the reduction gas generated from the melter-gasifier to each fluidized bed furnace; and
a fluidized bed stabilization unit for stabilizing the fluidized bed when the fluidized bed in each fluidized bed furnace is broken due to the unstable supply of the reduction gas from the bottom;
wherein the fluidized bed stabilization unit comprises an exhaust gas supply unit, the exhaust gas supply unit supplying the exhaust gas to the reduction gas supply tube interconnecting the melter-gasifier and the fluidized bed reduction furnaces at the time point when the pressure of the reduction gas within the fluidized bed reduction furnaces radically decreases with the occurrence of pressure peak.

3. The fluidized bed reduction reactor of claim 2 wherein the exhaust gas supply unit comprises an exhaust gas guide tube diverging some of the exhaust gas from the exhaust tube placed at the rear of the scrubber, a compressor for compressing the induced exhaust gas, compressed gas storage vessel for storing the compressed exhaust gas, a pressure control valve for controlling the pressure of the compressed gas, a nozzle for supplying the pressure-controlled gas to the reduction gas supply tube interconnecting the melter-gasifier and the fluidized bed reduction furnaces, and an exhaust gas supply tube interconnecting the respective components.

4. The fluidized bed reduction reactor of claim 3 wherein the pressure control valve opens at the time point when the pressure varying value of the pressure peak generated within the melter-gasifier increases to be over 0.05 bar/sec and the pressure of the reduction gas radically decreases, and closes when the pressure varying value is 0.05 bar/sec or less.

5. The fluidized bed reduction reactor of claim 3 wherein the compressed gas storage vessel is made with a volume so large as to store 20–30% of the average flux of the reduction gas generated from melter-gasifier.

6. The fluidized bed reduction reactor of claim 5 wherein the compressed gas storage vessel is provided with a plurality of pressure control switches such that the inner pressure thereof is controlled to be 1.5 to 2 times greater than the pressure applied to the melter-gasifier.

7. The fluidized bed reduction reactor of claim 3 wherein compressed gas supply nozzle comprises a circular tube portion externally surrounding the reduction gas supply tube interconnecting the melter-gasifier, and the melter-gasifier, and a plurality of linear tube portions branched from the circular tube portion while internally passing through the reduction supply tube and communicating with the reduction gas supply tube.

8. The fluidized bed reduction reactor of claim 7 wherein number of the branched linear tube portions is six (6) to eight (8).

9. A fluidized bed reduction reactor for reducing fine iron ore and supplying the reduced iron ore to a melter-gasifier, the fluidized bed reduction reactor comprising:
at least two or more fluidized bed furnaces pre-heating, pre-reducing, and finally reducing the charged fine iron ore with a reduction gas supplied from the melter-gasifier in a sequentially manner;
a scrubber receiving an exhaust gas from the final reduction furnace via an exhaust tube, cooling the exhaust gas, and scrubbing fine particles contained in the exhaust gas;
at least two or more iron ore discharge tubes intercommunicating the fluidized bed furnaces and intercommunicating the final reduction furnace and the melter-gasifier to discharge the charged iron ore to the subsequent furnace or the melter-gasifier;
at least two or more reduction gas supply tubes intercommunicating the fluidized bed furnaces and intercommunicating the final reduction furnace and the melter-gasifier to supply the reduction gas generated from the melter-gasifier to each fluidized bed furnace; and
a fluidized bed stabilization unit for stabilizing the fluidized bed when the fluidized bed in each fluidized bed furnace is broken due to the unstable supply of the reduction gas from the bottom;
wherein fluidized bed stabilization unit comprises an iron ore flow blockage prevention unit, the iron ore flow blockage prevention unit directly bypassing some of the reduction gas from each iron ore discharge tube disposed between the neighboring furnaces to the scrubber at the time point when the inner pressure of the melter-gasifier radically increases with the occurrence of pressure peak.

10. The fluidized bed reduction reactor of claim 9 wherein the iron ore flow blockage prevention unit comprises one or more bypass tubes disposed between each iron ore discharge tube interconnecting the neighboring furnaces and the exhaust tube connected to the scrubber, and a switching valve provided at each bypass tube to control the volume of the bypassed reduction gas.

11. The fluidized bed reduction reactor of claim 10 wherein the position where each bypass tube is connected to each iron ore discharge tube is placed on the same plane as or higher than the highest portion of the fluidized bed in the pre-reduction furnace or the final reduction furnace.

12. The fluidized bed reduction reactor of claim 11 wherein each bypass tube is formed with a heat-resistant steel, and has a diameter of half (½) the diameter of each iron ore discharge tube.

13. The fluidized bed reduction reactor of claim 11 wherein the iron ore flow blockage prevention unit further comprises a pressure gauge provided at the front portion of each iron ore discharge tube close to the fluidized bed furnace to be subsequently charged with the iron ore.

14. The fluidized bed reduction reactor of claim 13 further comprising nitrogen gas purging tubes provided at the front and the rear of each switching valve.

15. The fluidized bed reduction reactor of claim 14 wherein each nitrogen gas purging tube is provided with a control valve for controlling the amount of nitrogen gas to be supplied.

16. The fluidized bed reduction reactor of claim 15 wherein the switching valve provided between the pre-heating furnace and the pre-reduction furnace opens when the pressure varying speed detected at the pressure sensor provided at the iron ore discharge tube between the preheating furnace and the pre-reduction furnace is 0.05 bar/sec or more, and the switching valve provided between the pre-reduction furnace and the final reduction furnace opens when the pressure varying speed measured at the pressure sensor provided at the iron ore discharge tube between the pre-reduction furnace and the final reduction furnace is 0.03 bar/sec or more.

17. A fluidized bed reduction reactor for reducing fine iron ore and supplying the reduced iron ore to a melter-gasifier, the fluidized bed reduction reactor comprising:

at least two or more fluidized bed furnaces pre-heating, pre-reducing, and finally reducing the charged fine iron ore with a reduction gas supplied from the melter-gasifier in a sequentially manner;

a scrubber receiving an exhaust gas from the final reduction furnace via an exhaust tube, cooling the exhaust gas, and scrubbing fine particles contained in the exhaust gas;

at least two or more iron ore discharge tubes inter-communicating the fluidized bed furnaces and inter-communicating the final reduction furnace and the melter-gasifier to discharge the charged iron ore to the subsequent furnace or the melter-gasifier;

at least two or more reduction gas supply tubes inter-communicating the fluidized bed furnaces and inter-communicating the final reduction furnace and the melter-gasifier to supply the reduction gas generated from the melter-gasifier to each fluidized bed furnace; and a fluidized bed stabilization unit for stabilizing the fluidized bed when the fluidized bed in each fluidized bed furnace is broken due to the unstable supply of the reduction gas from the bottom;

wherein the fluidized bed stabilization unit comprises a backup gas supply unit, the backup gas supply unit supplying a backup nitrogen gas to the bottom of each fluidized bed reduction furnace when a nozzle of a distribution plate provided at the bottom of the fluidized bed reduction furnace is clogged.

18. The fluidized bed reduction reactor of claim 17 wherein the backup gas supply unit comprises a discharge control valve provided at each iron ore discharge tube, a first differential pressure sensor for detecting the differential pressure between the input and the output of each iron ore discharge tube, a second differential pressure sensor for detecting the differential pressure between the top and the bottom of each distribution plate, and a backup gas supply tube for supplying the backup gas to the bottom of each fluidized bed furnace.

19. The fluidized bed reduction reactor of claim 18 wherein the backup gas supply unit further comprises a thermometer provided at each iron ore discharge tube ahead of the corresponding discharge control valve to measure the temperature of the reverse-flowing reduction gas.

20. The fluidized bed reduction reactor of claim 19 wherein the backup gas used in the backup gas supply unit is a nitrogen gas.

21. The fluidized bed reduction reactor of claim 20 wherein the backup gas supply tube is provided at each reduction gas supply tube with a nitrogen gas switching valve for controlling the amount of nitrogen gas to be blown in.

22. The fluidized bed reduction reactor of claim 21 wherein the nitrogen gas switching valve opens when the differential pressure measured at the differential pressure sensor is 300 mmbar or more, and the iron ore discharge control valve closes after the nitrogen gas switching valve opens.

23. The fluidized bed reduction reactor of claim 21 wherein the nitrogen gas switching valve opens when the differential pressure measured at the differential pressure sensor is 100 mmbar or less, and the iron ore discharge control valve closes after the nitrogen gas switching valve opens.

24. The fluidized bed reduction reactor of claim 21 wherein the nitrogen gas switching valve opens when the temperature measured at the thermometer is 50° C. or more than the established reference temperature, and the iron ore discharge control valve closes after the nitrogen gas switching valve opens.

25. The fluidized bed reduction reactor of claim 2 wherein the fluidized bed stabilization unit further comprises an iron ore flow blockage prevention unit, the iron ore flow blockage prevention unit directly bypassing some of the reduction gas from each iron ore discharge tube disposed between the neighboring furnaces to the scrubber at the time point when the inner pressure of the melter-gasifier radically increases with the occurrence of pressure peak.

26. The fluidized bed reduction reactor of claim 25 wherein the fluidized bed stabilization unit further comprises a backup gas supply unit, the backup gas supply unit supplying a backup nitrogen gas to the bottom of each fluidized bed reduction furnace when a nozzle of a distribution plate provided at the bottom of the fluidized bed reduction furnace is clogged.

27. A method of stabilizing a fluidized bed for a fluidized bed reactor where the fine iron ore discharged from a charging bin is charged into a pre-heating furnace, fluidized-reduced while passing through a pre-reduction furnace and a final reduction furnace, and charged into a melter-gasifier, whereas the reduction gas generated from the melter-gasifier due to the combustion of coal is sequentially blown into the final reduction furnace, the pre-reduction furnace and the pre-heating furnace from the bottom via reduction gas supply tubes to reduce the fine iron ore charged therein, the method comprising the steps of:

intercepting each iron ore discharge tube interconnecting the neighboring furnaces at an initial working state;

forming the fluidized bed within each fluidized bed furnace through blowing the reduction gas into the furnace from the bottom, and charging the fine iron ore into the furnace from the top;

increasing the height of the fluidized bed such that the highest portion of the fluidized bed is placed at the same plane as the inlet of the corresponding iron ore discharge tube; and gradually opening the iron ore discharge tube after the fluidized bed is stabilized.

* * * * *